(12) United States Patent
Rajabali et al.

(10) Patent No.: US 8,426,007 B2
(45) Date of Patent: Apr. 23, 2013

(54) LAMINATE WITH LOCAL REINFORCEMENT

(75) Inventors: Abdoel Faziel Rajabali, Alphen aan den Rijn (NL); Max Arjan Markestein, Culemborg (NL)

(73) Assignee: Fokker Aerostructures B.V., LB Papendrecht (NL)

( * ) Notice: Subject to any disclaimer, the term of this patent is extended or adjusted under 35 U.S.C. 154(b) by 1262 days.

(21) Appl. No.: 10/562,832

(22) PCT Filed: Jul. 2, 2004

(86) PCT No.: PCT/NL2004/000473
§ 371 (c)(1),
(2), (4) Date: Feb. 23, 2006

(87) PCT Pub. No.: WO2005/002845
PCT Pub. Date: Jan. 13, 2005

(65) Prior Publication Data
US 2006/0159887 A1    Jul. 20, 2006

(30) Foreign Application Priority Data
Jul. 3, 2003    (NL) .................................... 1023811

(51) Int. Cl.
*B32B 3/24*    (2006.01)
*B64C 1/12*    (2006.01)
(52) U.S. Cl.
USPC ........... 428/138; 428/139; 428/140; 428/172; 428/596; 428/600; 244/120; 244/126; 244/133; 244/132; 244/123.3

(58) Field of Classification Search .............. 428/139, 428/140, 172, 596, 600, 138; 244/120, 126, 244/133, 132, 123.3
See application file for complete search history.

(56) References Cited

U.S. PATENT DOCUMENTS

| 5,160,771 A | 11/1992 | Lambing et al. |
| 5,500,272 A * | 3/1996 | Padden .................... 428/140 |
| 6,114,050 A * | 9/2000 | Westre et al. .............. 428/608 |
| 6,428,905 B1 * | 8/2002 | Behr et al. ................ 428/594 |
| 6,648,273 B2 * | 11/2003 | Anast ....................... 244/119 |

FOREIGN PATENT DOCUMENTS

| WO | WO 98/53989 | 12/1998 |
| WO | WO 02098734 A1 * | 12/2002 |
| WO | WO 03/068494 | 8/2003 |

* cited by examiner

*Primary Examiner* — William P Watkins, III
(74) *Attorney, Agent, or Firm* — Young & Thompson

(57) ABSTRACT

A laminate of metal layers and plastic bonding layers situated between the metal layers includes two external metal layers extending substantially continuously and at least one internal metal layer. At least one of the internal metal layers has at least one opening, and at the position of the opening the other metal layers and plastic bonding layers are bonded together to the form of a packet of lower thickness. The relatively thick parts of the laminate can be used for the transfer of forces.

18 Claims, 9 Drawing Sheets

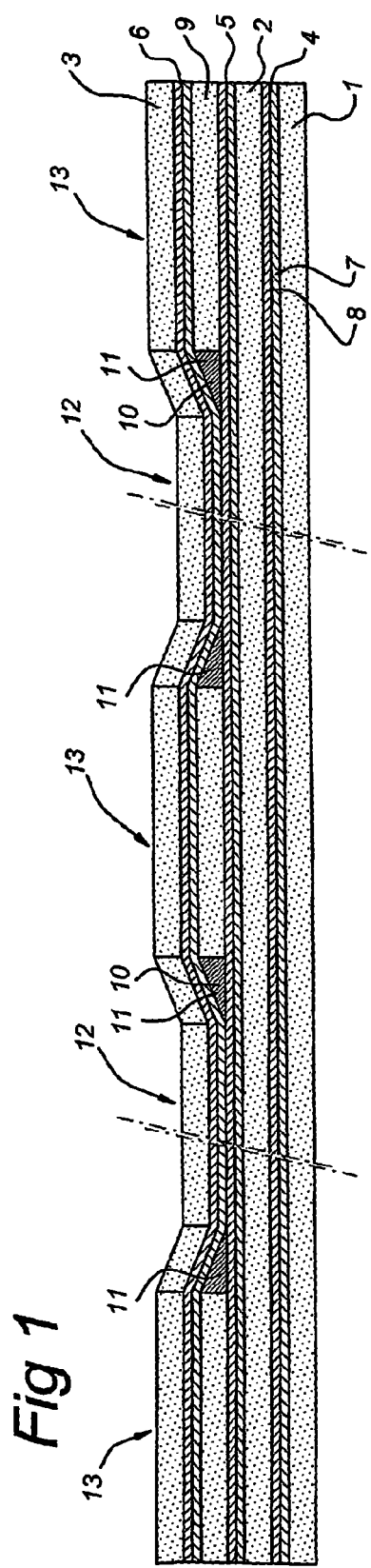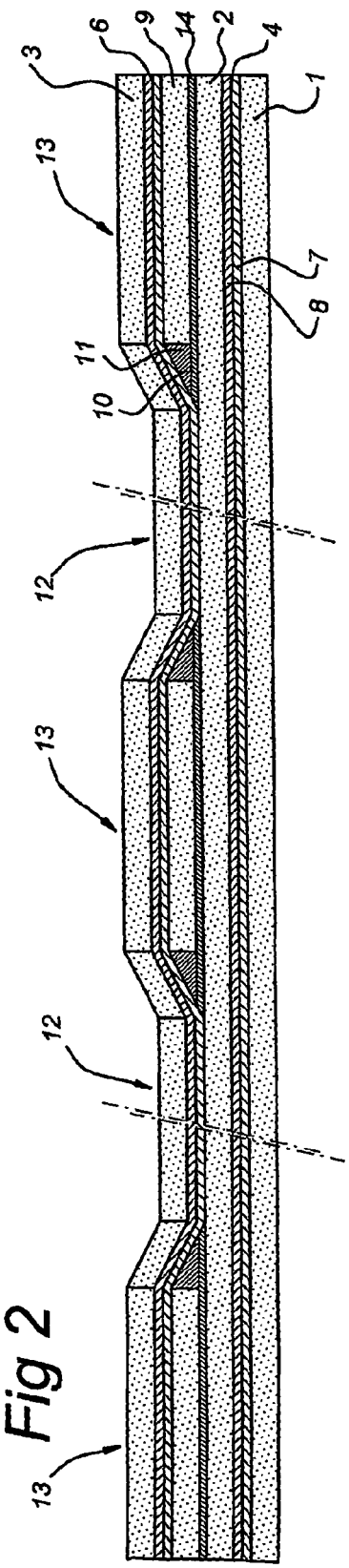

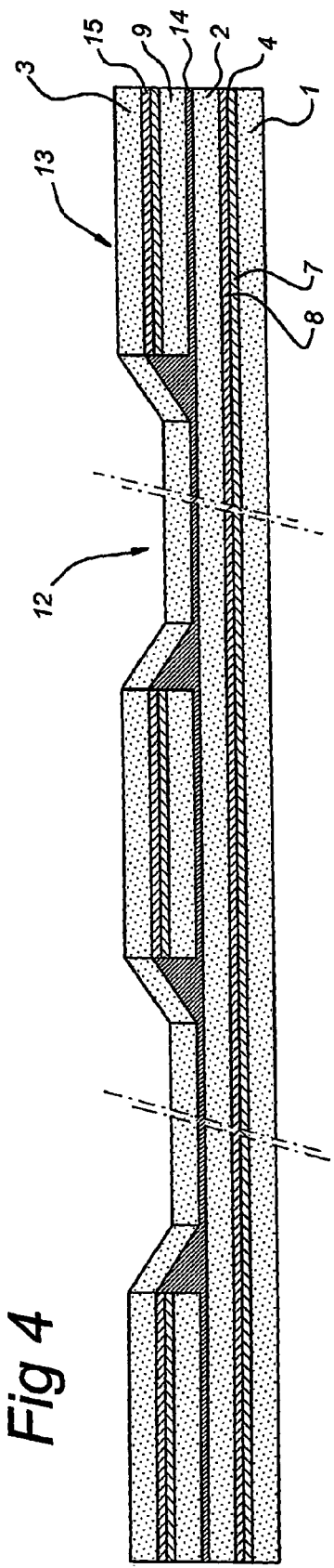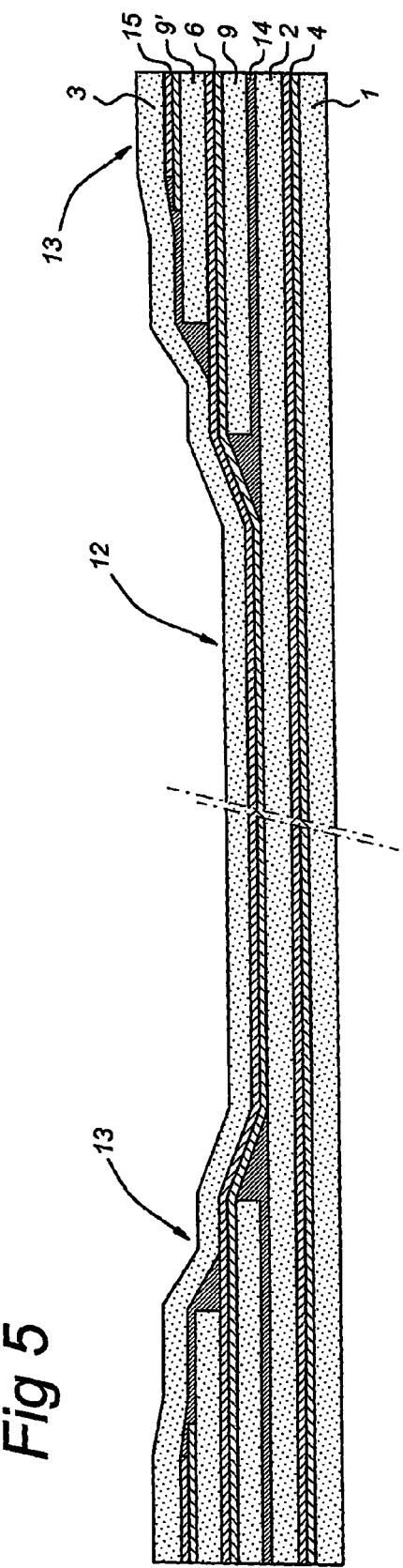

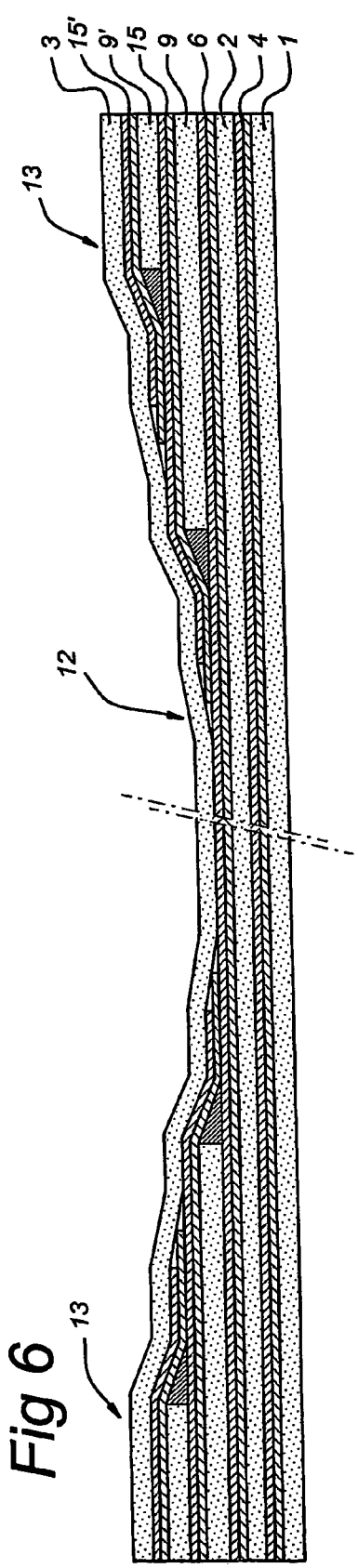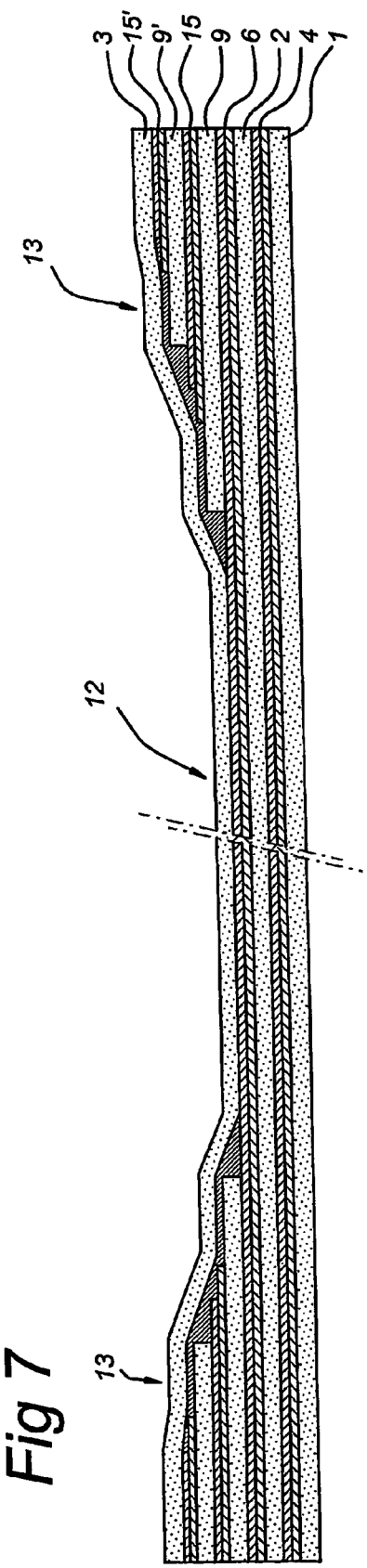

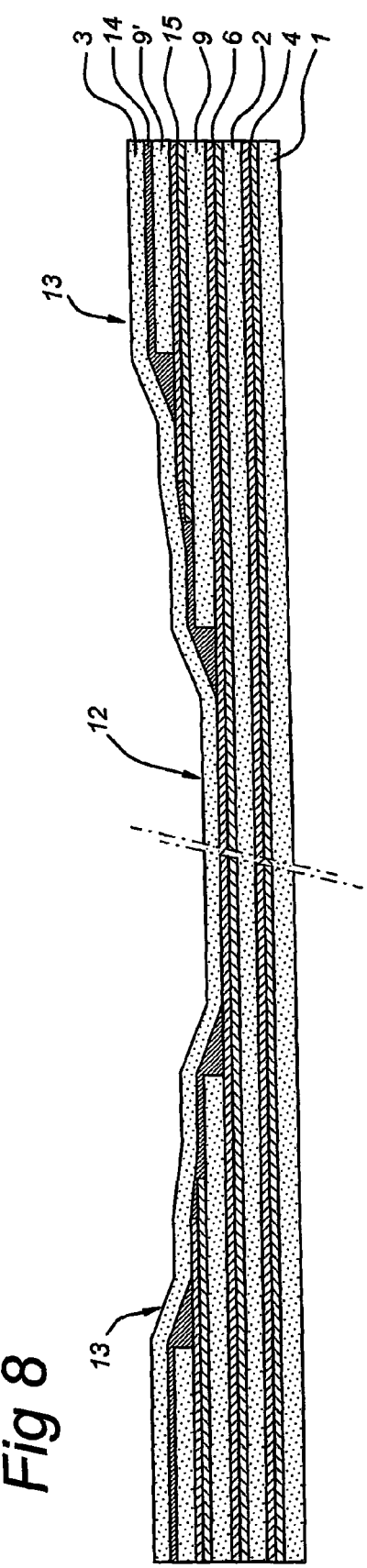
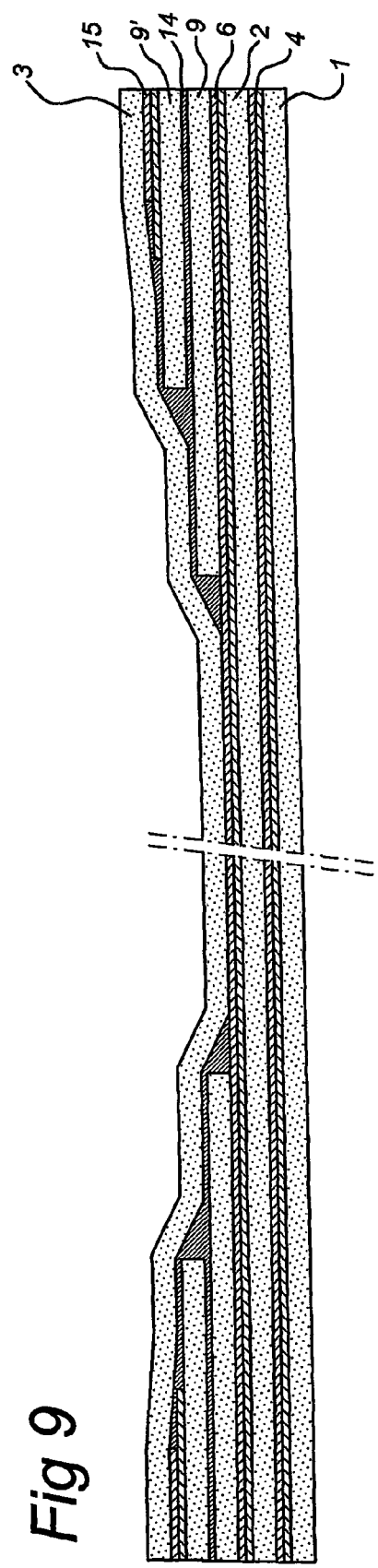
Fig 8
Fig 9

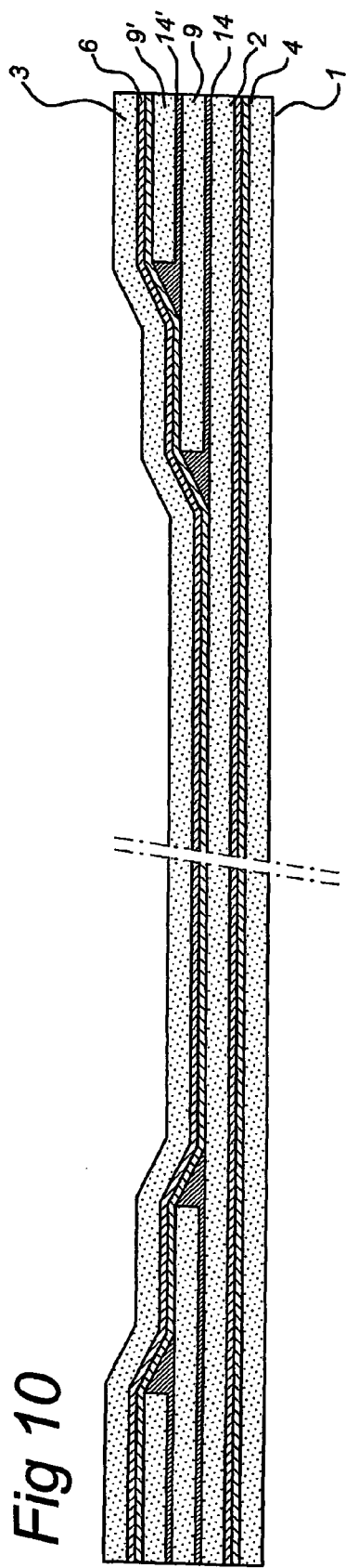
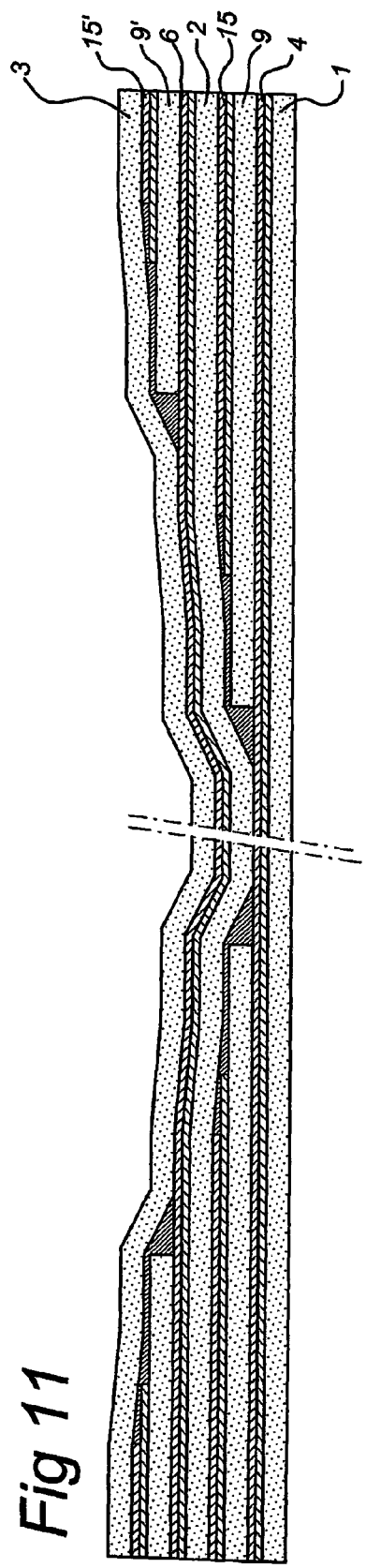

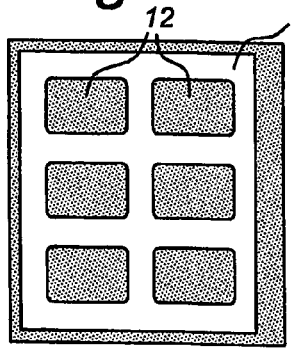
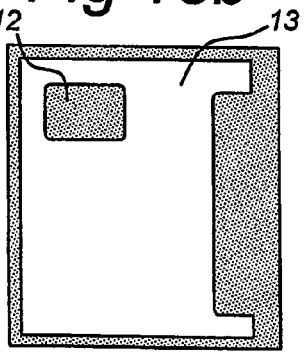
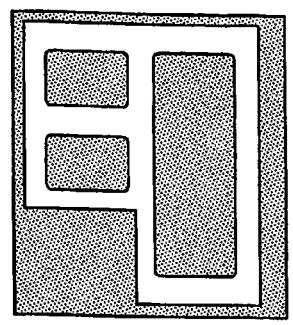
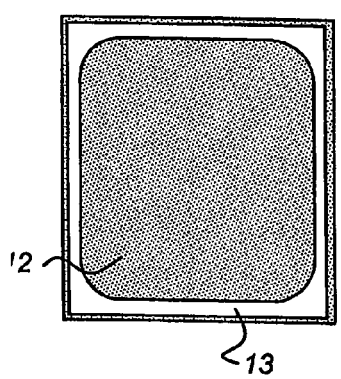
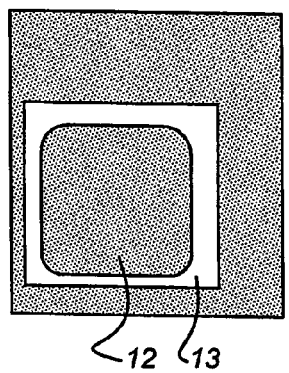
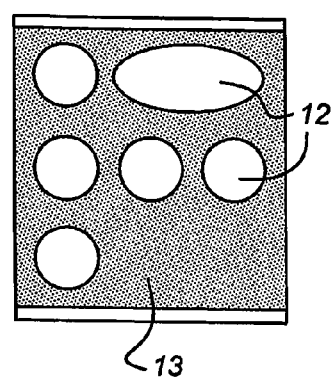
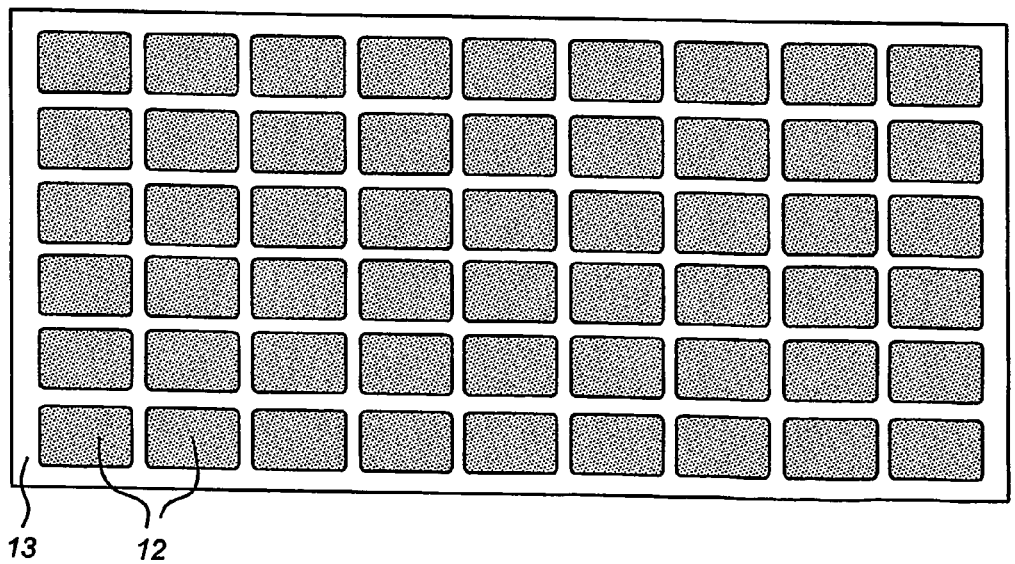

LAMINATE WITH LOCAL REINFORCEMENT

BACKGROUND OF THE INVENTION

1. Field of the Invention

The invention relates to a laminate of metal layers and plastic bonding layers situated between the metal layers, comprising two external metal layers extending substantially continuously and at least one internal metal layer. Such a laminate is known and is used in panels which can be used for various purposes. In particular, these can be lightweight panels of high rigidity and strength for use in the aviation and space travel industries. Such panels can also be used in other areas, such as for boats and road vehicles, containers and the like.

2. Description of the Related Art

As a result of the advantageous properties of the laminate, the panels can be of quite low thickness, while still meeting the requirements as regards rigidity and strength. This is a major advantage in the aviation and space travel industries in particular. Nevertheless, such panels also have disadvantages precisely because of that low thickness. These disadvantages emerge particularly when the panels are being fixed to other construction parts, such as frames, stiffeners and the like. A transfer of forces occurs at the positions where such fixing is performed and can give rise to stress concentrations particularly in the case of fixing methods where rivets or bolts are used.

SUMMARY OF THE INVENTION

The thin laminate is capable of absorbing such stress concentrations only to a limited extent. The object of the invention is therefore to provide a laminate of the type described above which exhibits better behaviour in a local connection to frames and the like, without the other advantages such as a relatively low weight and good mechanical properties being substantially adversely affected. That object is achieved by the fact that at least one of the internal metal layers has at least one opening and at the position of the opening the other metal layers and plastic bonding layers are bonded together to the form of a packet of lower thickness.

The metal layer with openings forms thickenings locally in the laminate, and preferably at the very points where a connection has to be made in the envisaged construction. It may be, for example, at the point where a frame or stiffening has to be fixed to a panel, as explained above. The locally greater thickness of the laminate leads to greater stress concentrations there, and also to a gradual transfer of forces from a row of rivets and the like into the other, thinner parts of the laminate.

The openings in the metal layer concerned can be of many different types, depending on the final construction. In particular, the openings can be closed in the peripheral direction.

The total surface area of the openings can be of the same order of magnitude as the surface area of the remainder of the metal layer provided with openings; furthermore, the total surface area of the openings can be greater than the surface area of the remainder of the metal layer provided with openings.

The laminate according to the invention can be constructed in various ways; the metal layer provided with openings is preferably situated between bonding layers with or without fibre reinforcement. According to a first possibility, the layer provided with openings can be bonded on either side to fibre-reinforced plastic bonding layers, which fibre-reinforced plastic bonding layers continue without interruption at the position of the opening and are bonded together at that point.

In another embodiment the layer provided with openings can be bonded on one side to a fibre-reinforced plastic bonding layer, and on the other side can be bonded by means of a bonding layer without fibre reinforcement to a further metal layer. At the position of the opening the fibre-reinforced plastic bonding layer which is bonded to the metal layer provided with an opening is bonded to the further metal layer.

The thickness of a metal layer is preferably less than 1.5 mm, and preferably lies between 0.1 mm and 0.8 mm. The plastic bonding layers can comprise fibres with carbon, aramid or glass. The metal layers can be Al, Cu, Mg, Ti, Sc and/or alloys of those metals.

BRIEF DESCRIPTION OF THE DRAWING FIGURES

The invention will be explained in greater detail below with reference to a number of exemplary embodiments illustrated in the figures.

FIG. 1 shows a cross section through a first embodiment of the laminate.

FIG. 2 shows a cross section through a second embodiment.

FIGS. 4-12 show further embodiments of the laminate.

FIGS. 13-16 show various patterns with recessed and raised areas in the laminate.

DETAILED DESCRIPTION OF THE INVENTION

Figure 3:
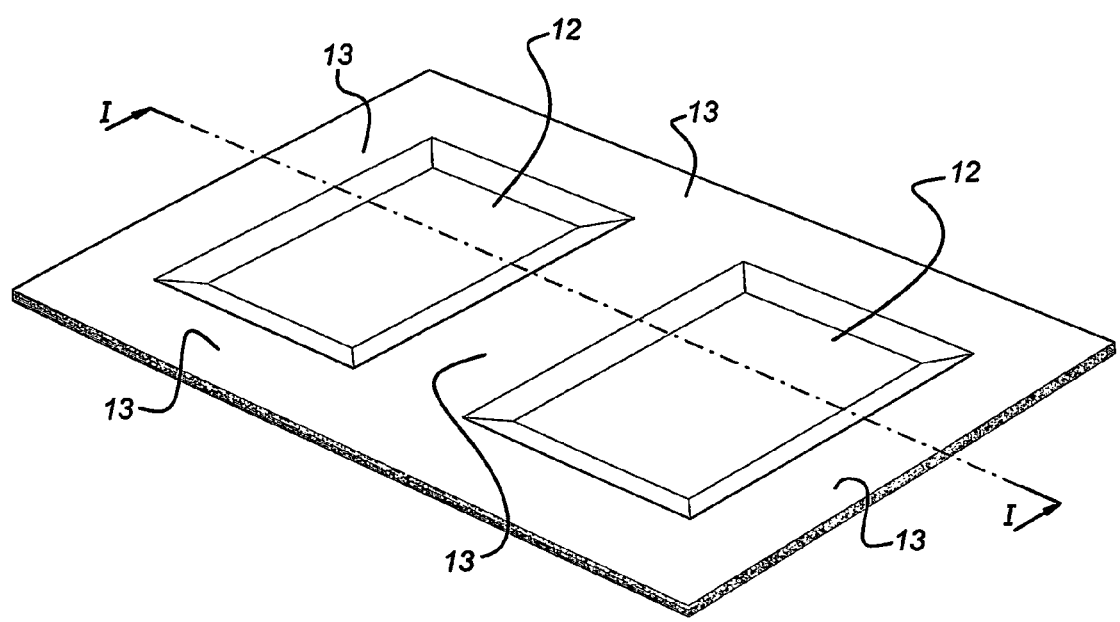
FIG. 3 shows a view in perspective of a panel constructed from the laminate according to the invention.

The laminate shown in FIG. 1 is composed of a number of continuous metal layers 1, 2 and 3, and also a number of continuous fibre-reinforced plastic bonding layers 4, 5 and 6. In the exemplary embodiment shown the fibre-reinforced plastic bonding layers 4, 5 and 6 each consist of two fibre layers 7, 8 with the desired orientation of the fibres.

According to the invention, a further metal layer 9, in which there are openings 10, is provided between the metal layers 2 and 3. At the position of said openings 10 the fibre-reinforced plastic bonding layers 5 and 6 are bonded to each other. The remaining open areas are filled with an adhesive 11.

As can be seen in the cross section of FIG. 1, and in the perspective view of FIG. 3, at the position of the openings 10 in the metal layer 9 recessed parts 12 are formed in the panel, enclosed by thicker edge areas 13. These edge areas 13 are suitable for acting as fixing areas, for example for frames, stiffeners and the like. The bolts or rivets by means of which these frames, stiffeners and the like are fixed to the laminate are supported in the relatively thick edge areas 13, in such a way that stress concentrations remain restricted to an acceptable level. The recessed areas 12 form the remainder of a panel made from the laminate and are designed to take the normal undisturbed shear stresses and tensile and bending stresses of the type occurring in the construction concerned.

This produces, on the one hand, the advantage of a panel with a relatively low weight, thanks to the recessed parts 12, while, on the other hand, the panel is still suitable for fixing to other construction parts at the position of the thickened edge areas 13, as shown in FIG. 3.

In the variant of FIG. 2 the laminate is likewise composed of three continuous metal layers 1, 2 and 3. Furthermore, two continuous fibre-reinforced plastic bonding layers 4, 6 are present. The metal layer 9 provided with openings 10 in this case is bonded to the metal layer 2 by a discontinuous adhesive layer 14 without fibre reinforcement. The fibre-reinforced plastic bonding layer 6 is bonded at the position of the openings 10 to the metal layer 2 situated below it.

In the variant of FIG. 4, which is largely identical to that of FIG. 3, the metal layer 9 provided with openings 10 is bonded to the metal layer 2 by means of a continuous adhesive layer 14 without fibre reinforcement. The fibre-reinforced plastic bonding layer 15 in this case is discontinuous at the position of the openings 10.

The fact that the invention is not limited to these variants will be clear from the further, non-exhaustive possibilities shown in FIGS. 5 to 12. In these figures the layers corresponding to the layers in the embodiments of FIGS. 1 and 2 are indicated by the same reference numerals. FIG. 5 shows not only a discontinuous metal layer 9, but also a further discontinuous metal layer 9'. The openings of the latter layer are aligned stepwise relative to each other at the position of the recessed part 12. Apart from the additional metal layer 9' and the interrupted fibre-reinforced bonding layer 15, this variant is the same as that of FIG. 2.

The variant of FIG. 6 has an additional interrupted metal layer 9' and two interrupted fibre-reinforced bonding layers 15, 15'.

In the case of the variant of FIG. 7 the fibre layers 15, 15' are not continued up to the fibre layers 6 and 15 respectively situated lower down, unlike the variant of FIG. 6.

In the case of the variant of FIG. 8 the external metal layer 3 is bonded at the level of the recess 12 to the fibre-reinforced plastic layer 6 and along a small part to the fibre-reinforced bonding layer 15. The connection between this external layer 3 and the second interrupted metal layer 9' is in the form of an adhesive layer 14 without fibre reinforcement.

In the variant of FIG. 9 also, an adhesive layer 14 without fibre reinforcement is present, namely between the two interrupted metal layers 9, 9'.

In the variant of FIG. 10 the continuous metal layer 9, the interrupted metal layer 9 and the interrupted metal layer 9' are all fixed to each other by means of adhesive layers 14, 14' without fibre reinforcement.

In FIG. 11 a continuous metal layer 2 is the division between the interrupted metal layers 9, 9'.

Figure 12:
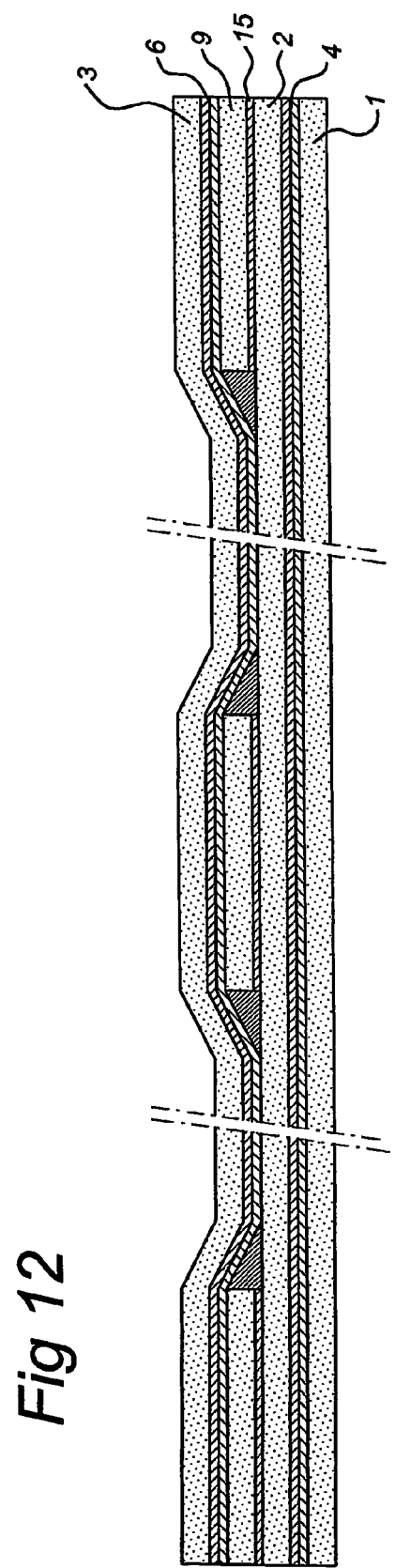

FIG. 12 is largely the same as the variant of FIG. 2, in the sense that in this case a fibre-reinforced plastic adhesive layer 15 is present between the continuous metal layer and the interrupted metal layer 9.

The variants in top view of FIGS. 13a to 13f show different patterns of raised areas 13 and recessed areas 12.

FIG. 14 shows a top view of a laminate with a framework 13 enclosing many recessed squares 12.

Figure 15:
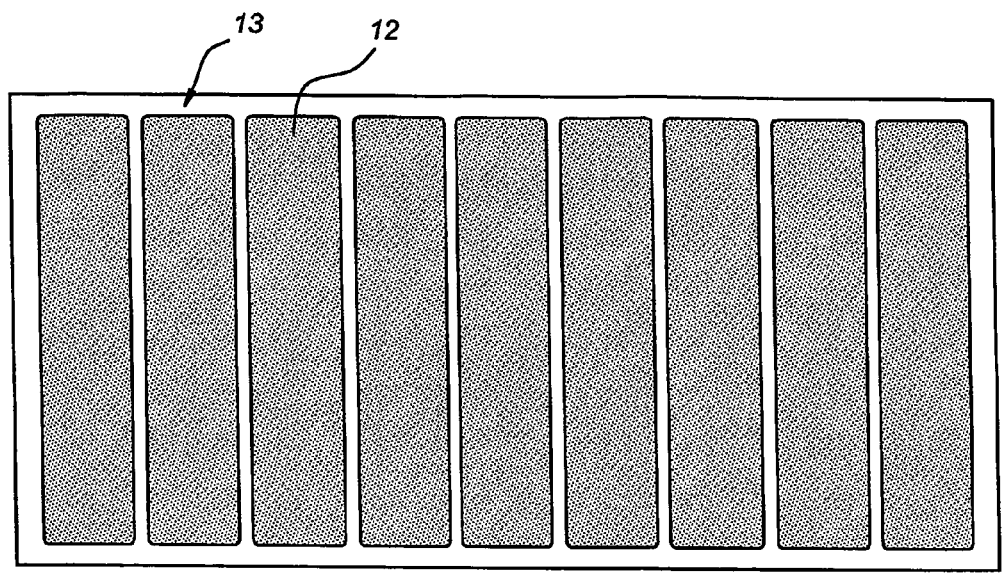

The variant of FIG. 15 shows a laminate with a framework 13 enclosing parallel elongated recessed areas 12, for example at the position of the frames in a fuselage or at the position of the ribs in a wing.

Figure 16:
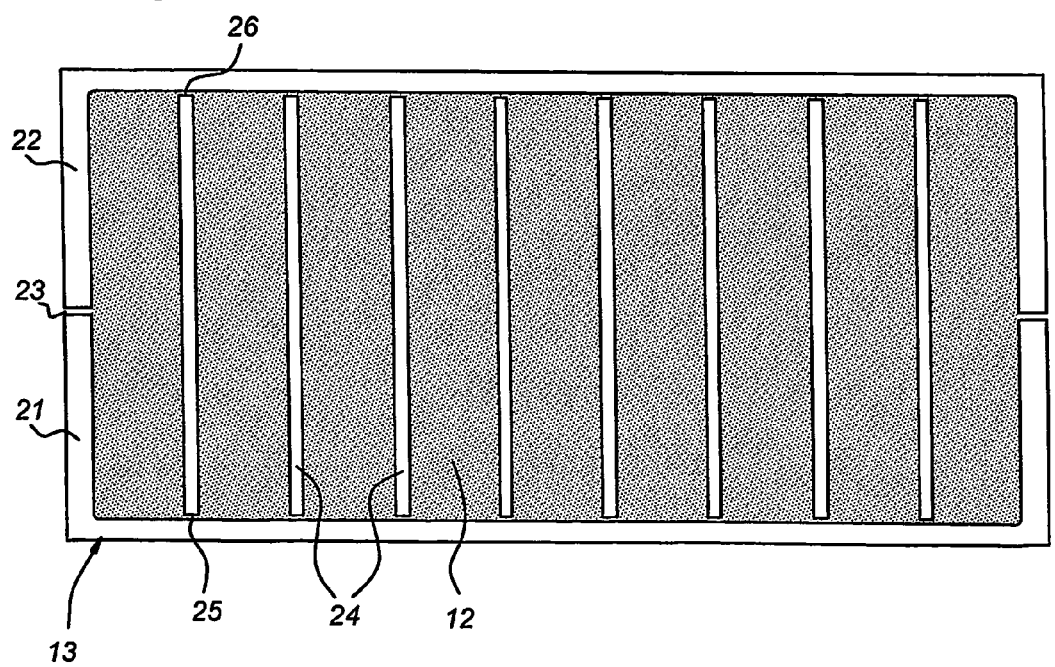

The variant of FIG. 16 shows that the framework 13 can be composed of several parts, namely the two outermost framework parts 21, 22, which rest closely against each other at the position of the seam 23, and the strips 24, which each rest against the framework parts 21, 22 respectively at the position of a seam 25, 26.

The invention claimed is:

1. A laminate, comprising:
    metal layers (1-3, 9);
    plastic bonding layers (4-6) situated between the metal layers (1-3, 9), two external metal layers (1, 3) extending substantially continuously; and
    at least one internal metal layer (2, 9), wherein,
    at least one of the internal metal layers (9) has at least one opening (10),
    at a position of the opening (10) the other metal layers (1-3) and the plastic bonding layers (4-6) are bonded together to form a packet of lower thickness,
    at least one of the openings (10) is peripherally closed,
    the metal layer provided with the peripherally closed opening (10) is situated between the plastic bonding layers (5, 6) and is bonded on either side to the plastic bonding layers (5, 6),
    the plastic bonding layers (5, 6) continue without interruption at a position of the peripherally closed opening (10) and are bonded together at that point, and
    at a location of the packet of lower thickness, an external layer (3) which extends continuously at said location has a stepwise recessed area (12) a step height of which is equal to a thickness of a single metal layer provided with the peripherally closed opening (10), and each internal metal layer (9) with a peripherally closed opening (10) being free from steps.

2. The laminate according to claim 1, in which a total surface area of the openings (10) is of a same order of magnitude as a surface area of a remainder (13) of the metal layer (9) provided with openings.

3. The laminate according to claim 1, in which a total surface area of the openings (10) is greater than a surface area of a remainder (13) of the metal layer (9) provided with openings.

4. The laminate according to claim 1, in which at least one of the plastic bonding layers (5, 6) comprises a fibre reinforcement.

5. The laminate according to claim 4, in which the metal layer (9) provided with the openings (10) is situated between the plastic bonding layers, and bonded on one side to a fibre-reinforced plastic bonding layer and on the other side is bonded to a bonding layer (14) without fibre reinforcement to a further metal layer (2).

6. The laminate according to claim 5, in which at the position of the opening (10) the fibre-reinforced plastic bonding layer (6) which is bonded to the metal layer (9) provided with an opening is bonded to the further metal layer (2).

7. The laminate according to claim 1, in which several internal metal layers are provided, at least two of which have at least one opening, and in which the openings of different metal layers at least partially cover each other.

8. The laminate according to claim 7, in which the openings are aligned relative to each other and together form a stepped narrowing.

9. The laminate according to claim 1, in which the metal layer (9) provided with an opening forms a framework (13).

10. The laminate according to claim 1, in which at least one of the metal layers with at least one opening comprises metal layer parts connecting to each other.

11. The laminate according to claim 1, in which the thickness of a metal layer is less than 1.5 mm.

12. The laminate according to claim 1, in which the thickness of a metal layer lies between 0.1 and 0.8 mm.

13. The laminate according to claim 1, in which at least one said plastic bonding layer comprises fibres of carbon, aramid or glass.

14. The laminate according to claim 1, in which the metal layers comprise at least one selected from the group consisting of Al, Cu, Mg, Ti, Sc and alloys of those metals.

15. The laminate according to claim 1, wherein the plastic bonding layers (5, 6) are fibre-reinforced, and remaining open areas are filled with an adhesive (11).

16. The laminate according to claim 1, wherein at least one of the internal metal layers (9) comprises two interrupted metal layers (9, 9'), and there is a layer of adhesive (14) between the two interrupted metal layers (9, 9').

17. The laminate according to claim 16, wherein the layer of adhesive (14) is without fibre reinforcement.

18. A laminate, comprising:

metal layers (1-3, 9);

plastic bonding layers (4-6) situated between the metal layers (1-3, 9), two external metal layers (1, 3) extending substantially continuously; and at least two internal metal layers (2, 9) are bonded to each other with adhesive, wherein, at least one of the internal metal layers (9) has at least one opening (10), at a position of the opening (10) the other metal layers (1-3) and the plastic bonding layers (4-6) are bonded together to form a packet of lower thickness, at least one of the openings (10) is peripherally closed, the metal layer provided with the peripherally closed opening (10) is situated between the plastic bonding layers (5, 6) and is bonded on either side to the plastic bonding layers (5, 6), the plastic bonding layers (5, 6) continue without interruption at a position of the peripherally closed opening (10) and are bonded together at that point, and at a location of the packet of lower thickness, an external layer (3) which extends continuously at said location has a stepwise recessed area (12) a step height of which is equal to a thickness of a single metal layer provided with the peripherally closed opening (10), and each internal metal layer (9) with a peripherally closed opening (10) being free from steps.

* * * * *

UNITED STATES PATENT AND TRADEMARK OFFICE
CERTIFICATE OF CORRECTION

PATENT NO. : 8,426,007 B2  
APPLICATION NO. : 10/562832  
DATED : April 23, 2013  
INVENTOR(S) : Rajabali et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1446 days.

Signed and Sealed this
Eighth Day of September, 2015

Michelle K. Lee
*Director of the United States Patent and Trademark Office*